April 15, 1952     F. J. BARTOSZ     2,593,090
METHOD OF FORMING A SEAM FOR UNITING
PLIES OF SHEET MATERIAL
Filed Sept. 15, 1950     2 SHEETS—SHEET 2
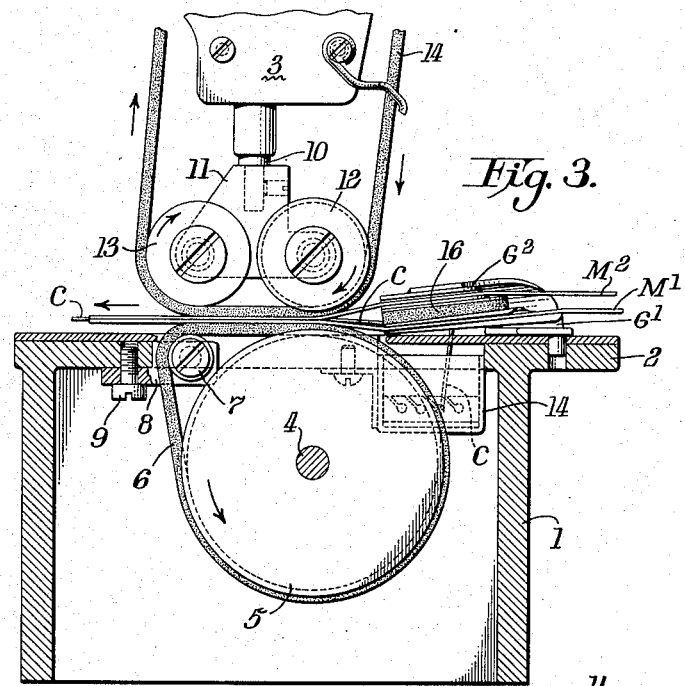
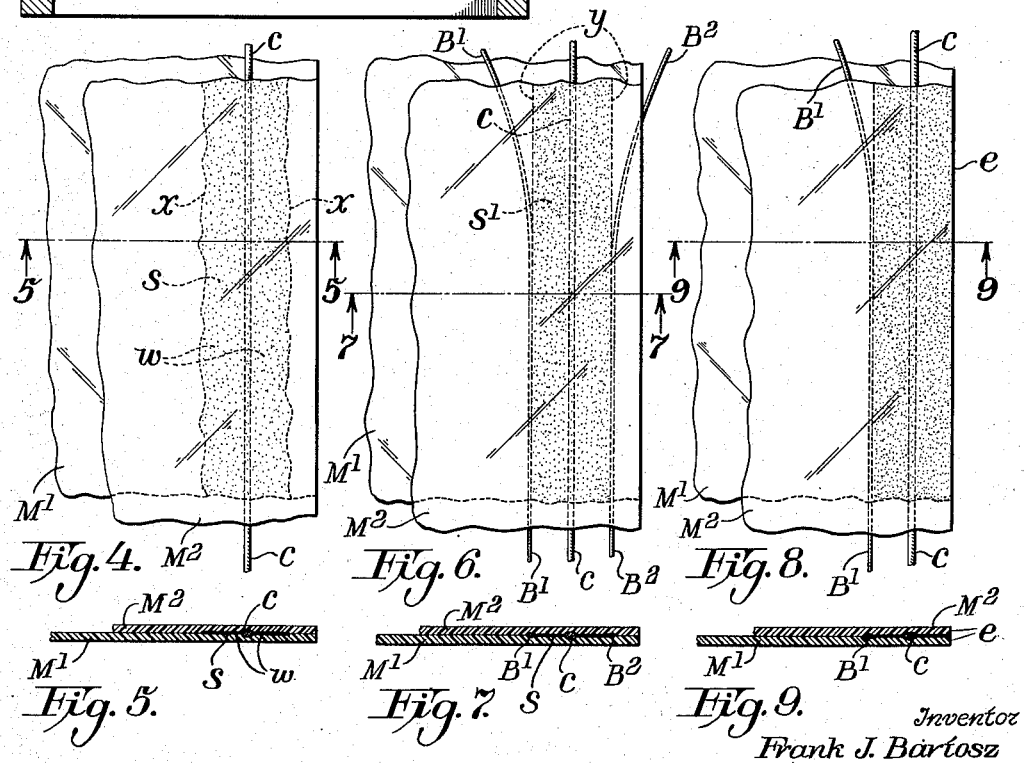
Inventor
Frank J. Bartosz
By
William P. Stewart
Attorney
Witness
N. Leszczak Patented Apr. 15, 1952

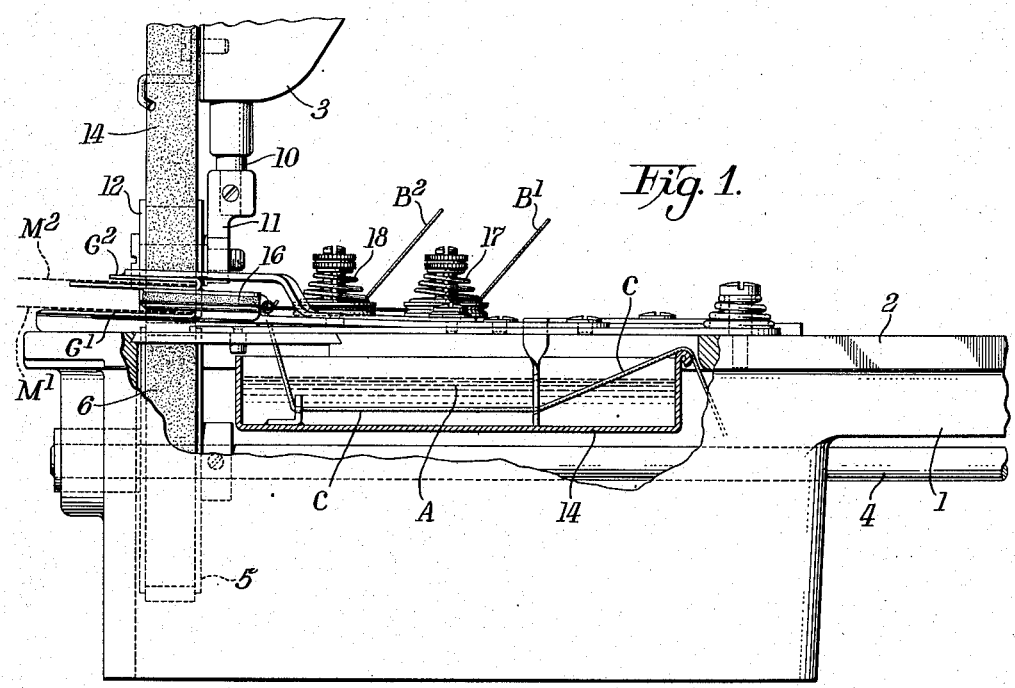
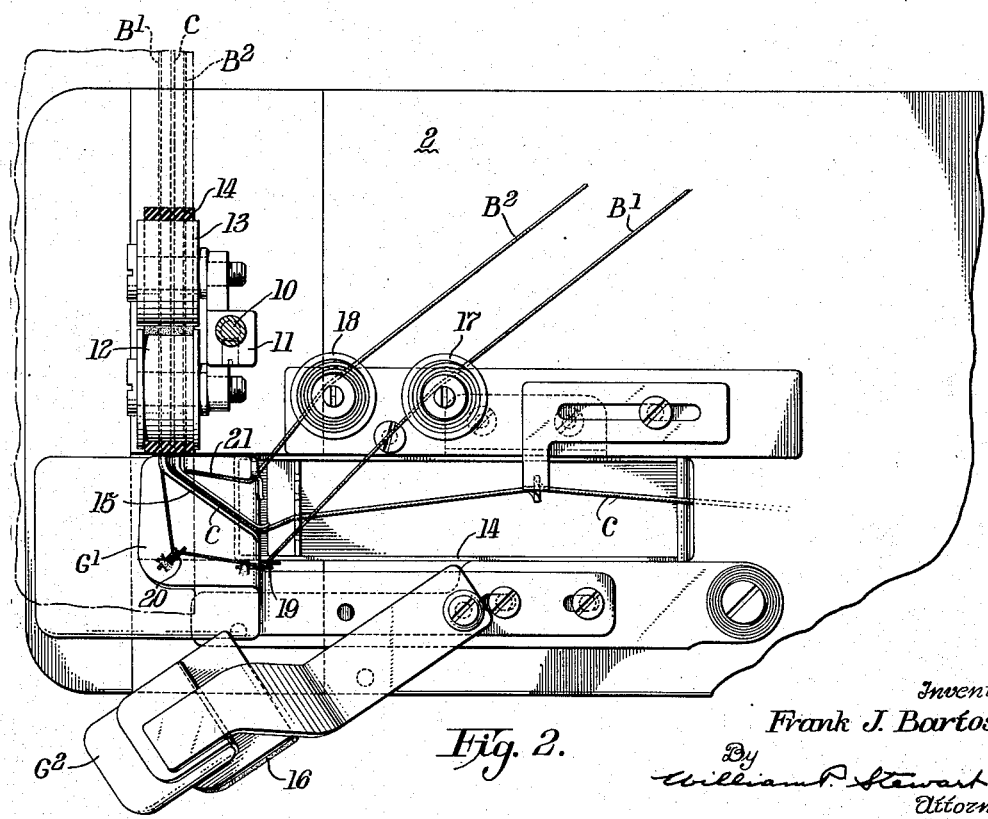

2,593,090

UNITED STATES PATENT OFFICE 2,593,090

METHOD OF FORMING A SEAM FOR UNITING PLIES OF SHEET MATERIAL

Frank J. Bartosz, Cranford, N. J., assignor to The Singer Manufacturing Company, Elizabeth, N. J., a corporation of New Jersey Application September 15, 1950, Serial No. 185,131

6 Claims. (Cl. 154—90)

This invention relates to seams for uniting plies of sheet material and to methods of making such seams.

As used in this specification, the term "sheet material" is intended to mean any or all of those relatively thin flexible sheet materials which are commonly used for making wearing apparel, household articles, such for example as curtains and the like, and various other articles of manufacture.

The most common means heretofore employed for uniting such materials has been by sewing but certain ones of the materials may be united advantageously, by other means such as welding, bonding, cementing etc. These latter uniting processes heretofore have been practiced in various ways, including (a) subjecting the materials to a radio frequency electric field while the materials are held together under pressure, thus forming an autogenous weld; (b) by introducing, between plies of the materials, by injection, by a thread, or otherwise, a uniting agent, such as cement, and pressing the plies together to cause them to be adhesively secured together; and (c) by introducing between plies of the materials a uniting agent including a solvent for one or both of the materials, thus softening at least one of them along a seam line and immediately applying pressure upon the plies to cause them to be permanently bonded together. The term "uniting agent," as used herein, is intended to mean any substance such as a cement or a solvent, or a combination of the two, which will cause the materials to be united.

This invention is concerned particularly with the methods described above under items (b) and (c) and it has as an object to provide an improved method whereby the seam thus made will be more uniform in appearance than those made heretofore by comparable methods.

For convenience, this invention will be described in connection with the uniting of plies of flexible plastic materials such, for example, as those made of synthetic resins and the uniting agent may be referred to as a "solvent," but it is to be understood that the invention is not limited to this specific material or uniting agent.

One of the methods heretofore employed for introducing a uniting agent between plies of plastic material to be united consists in passing a thread through a bath of liquid which includes a solvent for the material, impregnating the thread with the solvent and thereafter directing the thread between the plies in the line of seam formation. The plies of the material and the solvent-loaded thread therebetween are then subject to pressure, whereupon the solvent is pressed out of the thread at both sides thereof and immediately softens the surface of one or both of the materials. The plies are held together under pressure until the softened material has caused the plies to be secured together in two lines, one at each side of the solvent-transporting thread.

Unfortunately, due to varying conditions and to varying amounts of solvent picked up by the thread at different points throughout its length, the spread of the solvent at opposite sides of the thread heretofore has frequently been uneven so that the completed seam varied considerably in width and presented an irregular appearance along its edges, all of which is quite objectionable in the finished product, especially when the material used is transparent.

This invention has as an object to overcome the irregular width and objectionable appearance of a seam made by the method of introducing, between plies of material to be united, a uniting agent for the materials. This has been accomplished by controlling and limiting the spread of the uniting agent as the materials, with the uniting agent therebetween, are placed under pressure, so that the resulting seam is of uniform width and the edges thereof are smooth and straight.

One method of attaining this result comprises introducing between the plies of material to be united and at one or both sides of a solvent-loaded thread, one or more dry or solvent-free threads. These dry threads form barriers which limit the spread of the uniting agent, thereby producing a seam of uniform width having straight edges. Preferably two barrier threads are used where the seam is to be formed at a distance from the edges of the plies to be united. Where the seam is made at the very edges of the two plies, one barrier thread will suffice. After the seam has been completed the barrier thread, or threads, may be removed, if desired.

Among the various plastic materials which I have united successfully by this method are those known in the trade by the names "Vinylite," made by Bakelite Corporation, Bound Brook, N. J., "Krene" made by National Carbon Company, Inc., New York, N. Y. and "Velon" made by Firestone Industrial Products Company, Akron, Ohio.

One uniting agent which I have used for uniting these materials comprises—

| | Per cent by weight |
|---|---|
| VYDR Resin (Bakelite Corp.) | 6.0 |
| Toluol | 12.0 |
| Cyclohexanone | 30.0 |
| Methyl ethyl ketone | 47.0 |
| Propylene oxide | 5.0 |

Drawings illustrating this invention and one form of mechanism which may be used to perform this method of uniting plies of sheet material are annexed as a part of this disclosure and in such drawings:

Fig. 1 is a side elevation, partly in section, of a portion of a machine adapted to practice the hereindescribed method, to produce the improved seam.

Fig. 2 is a plan view, partly in section, of the portion of the machine shown in Fig. 1 with one of the work guides shifted out of operative position.

Fig. 3 is a left end view, partly in section, of the machine shown in Figs. 1 and 2.

Fig. 4 is a plan view of two pieces of transparent plastic material united by a seam made in accordance with a previously known method, employing only a single solvent-bearing thread and illustrating the uncontrolled and uneven spread of the solvent at opposite sides of the thread.

Fig. 5 is a sectional view taken on line 5—5 of Fig. 4.

Fig. 6 is a plan view of two pieces of transparent plastic material united by a seam made in accordance with this invention and employing a solvent-bearing thread and two barrier threads which serve to restrict the spread of the solvent pressed out of the first named thread.

Fig. 7 is a sectional view taken in line 7—7 of Fig. 6.

Fig. 8 is a view similar to Fig. 6 but showing the seam made at one edge of the plies of plastic material, with only one barrier thread used to restrict the spread of the solvent.

Fig. 9 is a sectional view taken on the line 9—9 of Fig. 8.

Referring more specifically to the drawings, and first to Figs. 4 and 5, there are shown two plies, $M^1$, $M^2$ of sheet material united by a seam S produced by a previously known method. This known method consists in directing between the plies a thread C carrying a suitable uniting agent, such, for example, as an adhesive or a solvent for one or both of the plies. Pressure is applied to the plies in line with the thread C and the uniting agent is pressed from the thread at opposite sides thereof and spread between the plies as indicated at $w$. The pressure is maintained on the plies until the uniting agent has permanently bonded the two plies together along the line of the seam. Inasmuch as there is nothing to control the spread of the uniting agent it will frequently spread unevenly, with the result that the outer edges of the bond will be irregular or crooked as indicated by the lines $x$.

This invention has as an object to improve the seam produced when a thread, carrying a uniting agent is introduced between two plies of material and pressure is applied thereto, as above described. This has been accomplished, as illustrated in Figs. 6 and 7 by introducing between the plies, simultaneously with, and parallel to, the thread C, which is loaded with a uniting agent, two barrier threads $B^1$, $B^2$. These barrier threads are spaced equally at opposite sides of the carrier thread C and do not carry any uniting agent. When the plies $M^1$ and $M^2$ are placed under pressure, in line with the carrier thread, the barrier threads limit the spread of the uniting agent, thereby causing the uniting bond, or seam $S^1$, to have straight, smooth edges as indicated by the lines $y$ in Fig. 6. Pressure is maintained on the plies $M^1$ and $M^2$ of the material until the plies have been bonded together as above described. After the seam has been completed, the barrier threads may be left in the seam, if desired, their line contact with the uniting agent being sufficient to hold them against accidental displacement, but preferably they will be removed from the seam by pulling them outwardly from the seam as indicated in the upper portion of Fig. 6.

Figs. 8 and 9 illustrate a modified form of seam in which only one barrier thread $B^1$ is used. This form of seam may be employed to advantage where the seam is formed along the very edges of two plies $M^1$, $M^2$ of material, there being no necessity to restrict the flow of the uniting agent toward the marginal edge $e$ of the plies.

This improved method of uniting plies of sheet material with the novel seam disclosed herein may be practiced to advantage by a machine partially illustrated in Figs. 1, 2 and 3 of the annexed drawings. This machine may include a frame generally in the form of a sewing machine frame having a base 1, a horizontally disposed work-supporting plate 2, an overhanging bracket-arm, not shown, which terminates in a vertically arranged bracket-arm head, a lower portion of which is shown in Figs. 1 and 3, and designated as 3.

Journaled horizontally in the base 1 is a rotary feed shaft 4 which may be driven from any suitable source of power, not shown. At one end, the shaft 4 carries a lower feed-wheel 5 which is substantially embraced by a lower feed belt 6. Rearwardly of the wheel 5, the belt 6 passes over an idler wheel 7 which is journaled in a block 8 secured to the under side of the work-supporting plate, as by one or more screws 9. Mounted in the bracket-arm head 3 is a vertically arranged, spring depressed, presser-bar 10 which carries, at its lower end, a bracket 11 in which is journaled a front upper feed and presser roller 12. The axis of the roller 12 is vertically aligned with the axis of the lower feed wheel 5. The bracket 10 also carries a rear upper feed and presser roller 13 which overlies the idler wheel 7. Journaled in the bracket-arm is a shaft, not shown, which is rotated synchronously with the shaft 4 and carries an upper drive pulley which has the same diameter as the feed-wheel 5. A combined feed and presser belt 14 is passed over the upper drive pulley and around the presser rollers 12, 13. This belt 14 travels at the same rate as the feed-belt 6 and cooperates with the latter in moving material through the machine. Plies $M^1$ and $M^2$ of sheet material to be united are passed through adjustably mounted guides $G^1$, $G^2$, respectively, and are directed between the belts 6 and 14.

As hereinbefore indicated, a thread C, carrying a suitable uniting agent, is introduced between the plies $M^1$, $M^2$. This may be accomplished by drawing the thread from a suitable supply, not shown, and passing it through a bath of uniting agent A contained within a chamber 14 located below the level of the work-supporting plate 2. After the thread C has picked up a quantity of the uniting agent A from the chamber 14, it passes upwardly and thence through a substantially horizontal channel 15 formed on the upper side of the lower guide member $G^1$. This channel directs the thread C between the plies $M^1$ and $M^2$ and into the line of seam formation. A pad 16 carried by the under side of the upper guide member $G^2$ overlies the channel 15 and bears lightly upon the thread C to wipe off any excess uniting agent, whereupon the excess will be returned by gravity to the chamber 14.

The barrier threads $B^1$, $B^2$ are taken from any suitable supply, not shown, and are passed, respectively, through tension devices 17, 18, guides 19, 20 and 21, into the line of seam formation, parallel to, but spaced laterally from the thread C at opposite sides thereof.

As the plies $M^1$, $M^2$ of the sheet material are advanced by the feed belt 6, in combination with the combined feed and presser belt 14, the threads C, $B^1$ and $B^2$ are drawn in between the plies in the line of seam formation. As the elements pass between the feed wheel 5 and the presser roller 12 the uniting agent will be pressed from the thread C and laterally into contact with the barrier threads $B^1$, $B^2$, as above described. The elements will be held against relative movement while they are passing between the belts 6 and 14 and during that time a permanent bond is made between the plies $M^1$, $M^2$.

From the foregoing it will be apparent that this invention has rendered available a new method of uniting plies of sheet material as well as a new and improved seam for that purpose.

While the uniting agent has been hereinbefore described as introduced between the plies by a carrier-thread C, it is to be understood that the present invention is not limited to the employment of a thread for that purpose.

Having thus set forth the nature of the invention, what I claim herein is:

1. The method of uniting plies of plastic material which comprises introducing between plies of the material a first thread carrying a solvent of at least one of said materials; also introducing between said plies and spaced from the solvent-carrying thread a solvent-free thread; applying pressure to said plies and to said threads to cause the solvent to be pressed out of said first thread and onto the adjacent faces of the plies of said plastic materials and into contact with the adjacent side of the solvent-free thread; and maintaining the pressure on the plies and threads until the solvent has softened a portion of one of said plies and bonded it to the adjacent ply.

2. The method of uniting plies of plastic material which comprises introducing between superposed plies of the material a first thread carrying a solvent of at least one of said materials; also introducing between said plies, and spaced substantially equally from opposite sides of the solvent-carrying thread, a pair of barrier threads; applying pressure to said plies and to said threads to cause the solvent to be pressed out of said first thread and laterally thereof into contact with said plies and with the adjacent sides of said barrier threads; and maintaining the pressure on said plies and threads until said plies are bonded together.

3. The method of uniting plies of sheet material which comprises introducing between superposed plies of the material a first thread carrying a uniting agent; also introducing between said plies, at opposite sides of said thread, a pair of barrier threads; applying pressure to said plies and to said threads to cause the uniting agent to be pressed out of said first thread and laterally thereof into contact with said plies and with said barrier threads; and maintaining the pressure on said plies and threads until said plies are bonded together.

4. The method of forming a seam for uniting plies of sheet material which comprises introducing between superposed plies of the material a first thread carrying a uniting agent; also introducing between said plies and spaced from and substantially parallel to said first thread a barrier-thread; applying pressure to said plies and to said threads to cause the uniting agent to be pressed out of said first thread and laterally thereof into contact with said plies and with said barrier-thread; maintaining the pressure on said plies and threads until said plies are bonded together by said uniting agent; and finally removing said barrier-thread from between said plies.

5. The method of joining together two plies of sheet material which comprises inserting between said plies a pair of spaced barrier-threads; introducing between said plies and between said barrier-threads a uniting agent; applying pressure to said plies and threads to cause said uniting agent to be spread laterally between said plies and into contact with the adjacent sides of said barrier-threads; and maintaining the pressure on said plies and threads until said plies are bonded together by said uniting agent.

6. The method of joining together two plies of sheet material; comprising guiding said plies into slightly spaced superposed relationship; inserting a pair of spaced barrier threads between said superposed plies, inserting a thread carrying a uniting agent between said superposed plies at a location between said barrier threads; and pressing said plies together, thereby causing said uniting agent to spread over the adjacent faces of said plies between said barrier threads, thus joining said plies in the area bounded by said barrier threads.

FRANK J. BARTOSZ.

REFERENCES CITED

The following references are of record in the file of this patent:

UNITED STATES PATENTS

| Number | Name | Date |
|---|---|---|
| 1,923,837 | McLaurin | Aug. 22, 1933 |
| 2,500,053 | Andrews | Mar. 7, 1950 |